United States Patent
Garcia

(10) Patent No.: US 9,018,848 B2
(45) Date of Patent: Apr. 28, 2015

(54) METHOD OF POWERING FLASHLIGHT TAILCAPS

(71) Applicant: Richard Jeff Garcia, Beaumont, CA (US)

(72) Inventor: Richard Jeff Garcia, Beaumont, CA (US)

(73) Assignee: Jonlincia LLC, Yucaipa, CA (US)

( * ) Notice: Subject to any disclaimer, the term of this patent is extended or adjusted under 35 U.S.C. 154(b) by 214 days.

(21) Appl. No.: 13/573,638

(22) Filed: Sep. 29, 2012

(65) Prior Publication Data

US 2014/0091725 A1   Apr. 3, 2014

(51) Int. Cl.
*H05B 37/02* (2006.01)
*F21L 4/02* (2006.01)
*H05B 33/08* (2006.01)
*F21Y 101/02* (2006.01)

(52) U.S. Cl.
CPC .............. *H05B 37/0281* (2013.01); *F21L 4/02* (2013.01); *F21L 4/027* (2013.01); *F21Y 2101/02* (2013.01); *H05B 33/0824* (2013.01); *H05B 33/0842* (2013.01); *H05B 33/0845* (2013.01); *Y02B 20/42* (2013.01)

(58) Field of Classification Search
USPC ...... 315/210, 228, 232, 240, 241 R, 294, 307
See application file for complete search history.

(56) References Cited

U.S. PATENT DOCUMENTS 7,466,082 B1 * 12/2008 Snyder et al. ............. 315/200 A
8,148,912 B2 * 4/2012 Kim ............................. 315/291

* cited by examiner

*Primary Examiner* — Daniel D Chang

(57) ABSTRACT

A method for powering two circuits in a portable light that are connected by a single conductive chassis so that each of the two circuits is able to have time shared access to a power source.

25 Claims, 4 Drawing Sheets

Schematic that shows one embodiment of a powered tail cap circuit

FIG 1 – Schematic that shows one embodiment of a powered tail cap circuit
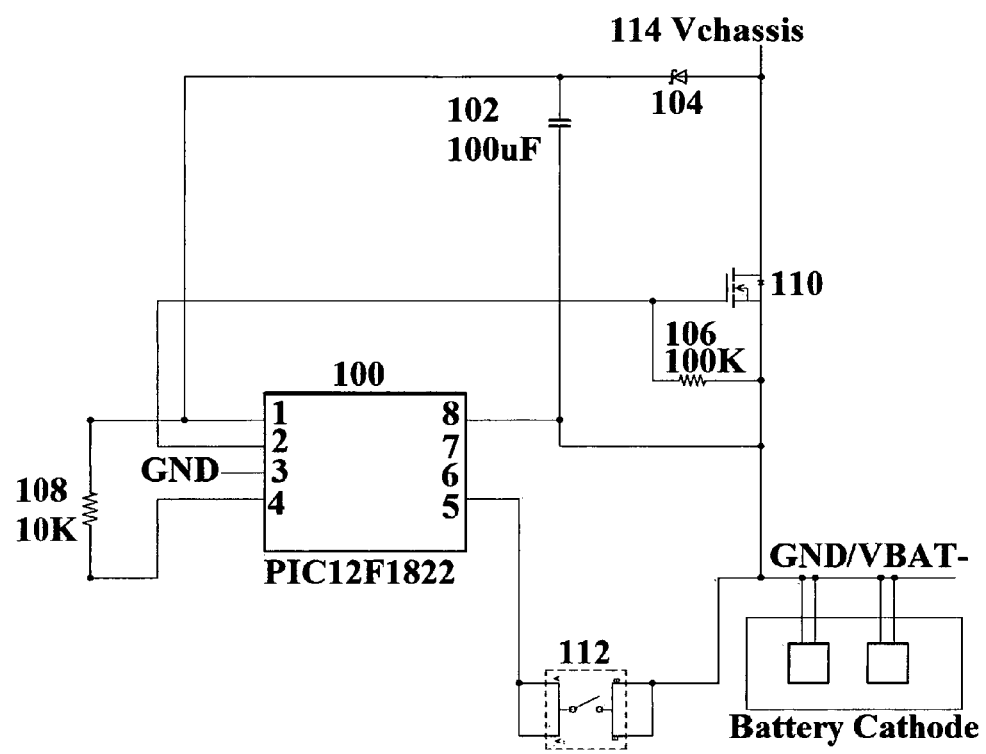

Fig 2 – Schematic that shows one embodiment for a flashlight driver circuit
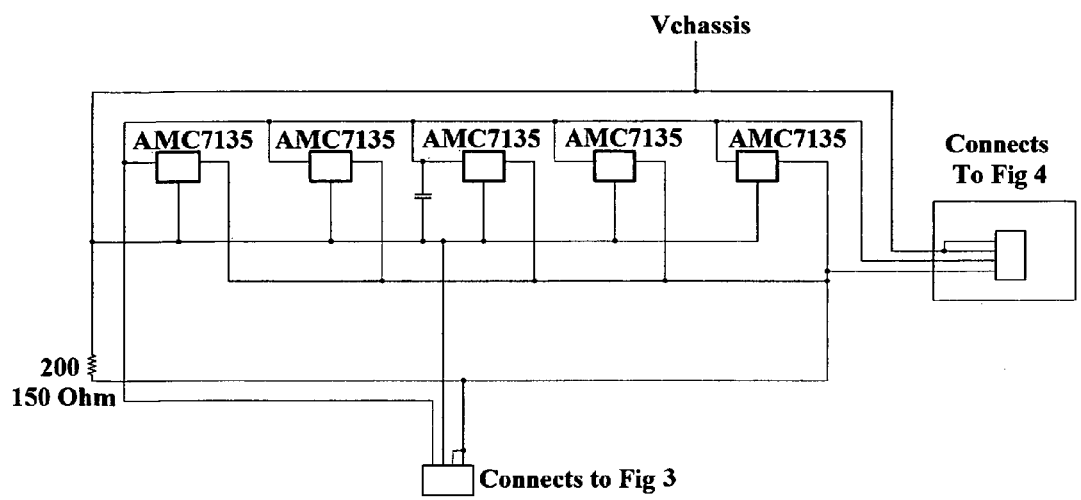

Fig 3 – Schematic that shows one embodiment for a flashlight battery contact circuit
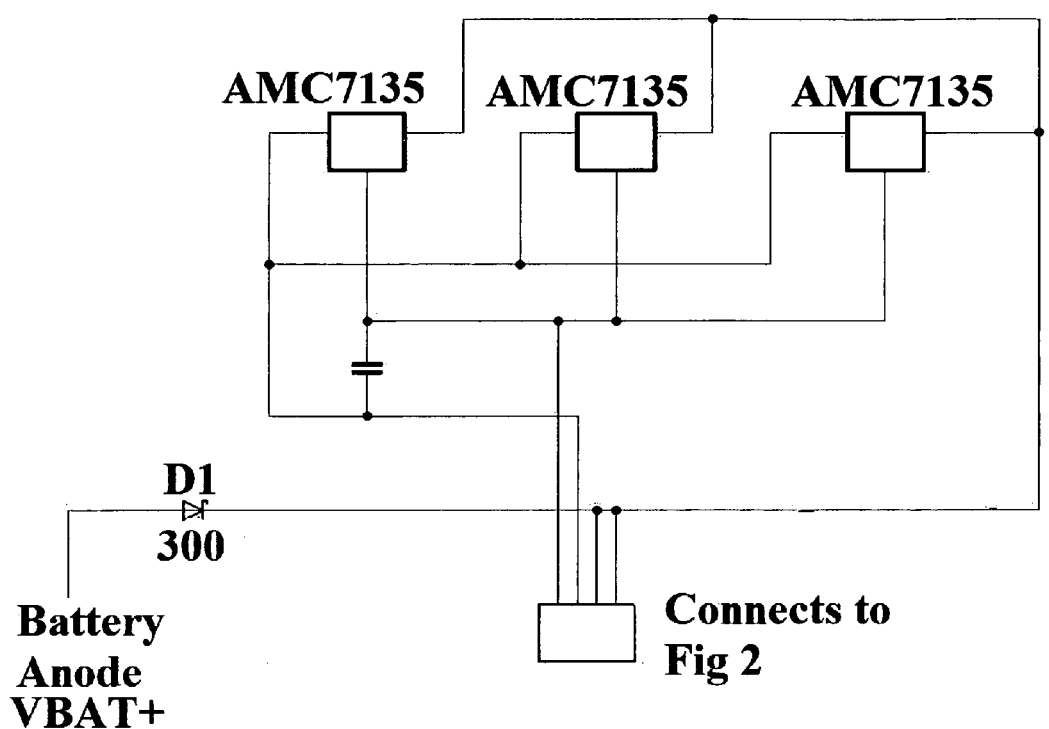

Fig 4 – Schematic that shows one embodiment for a flashlight LED circuit
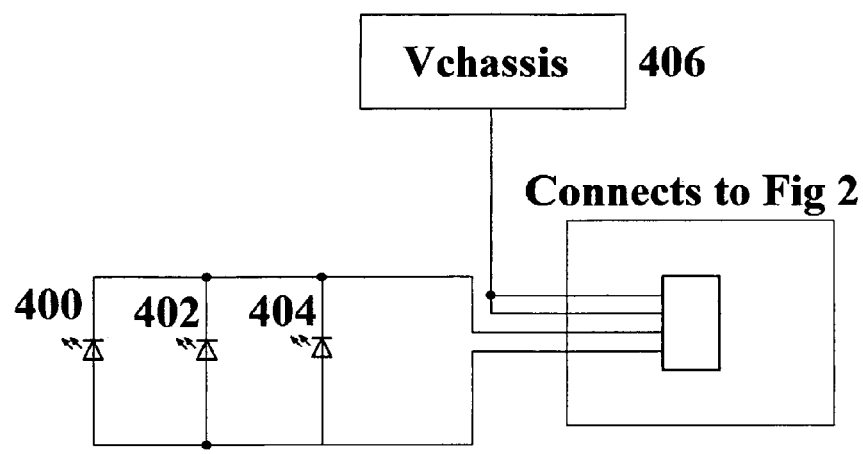

METHOD OF POWERING FLASHLIGHT TAILCAPS

CROSS REFERENCE TO RELATED APPLICATIONS

This application claims the benefit of provisional patent application No. 61/626,663 filed Oct. 1, 2011 by the present inventor.

FEDERALLY SPONSORED RESEARCH

Not Applicable

SEQUENCE LISTING OR PROGRAM

Not Applicable

BACKGROUND

1. Prior Art

The following tabulation is some prior art that presently appears relevant:

| US Patent Number | US Patent Issue Date | Patentee |
|---|---|---|
| 7,594,735B2 | Sep. 29, 2009 | Kang et al. |
| 7,652,216 | Jan. 26, 2010 | Sharrah et al. |
| 6,841,941 | Jan. 11, 2005 | Kim et al. |
| 7,393,120 | Jul. 1, 2008 | Kang et al. |
| 7,771,077 | Aug. 10, 2010 | Miller |
| 8,096,674 | Jan. 17, 2012 | Matthews et al. |
| 7,517,109 | Apr. 14, 2009 | Kim et al. |
| 7,880,100 | Feb. 1, 2011 | Sharrah et al. |
| 7,722,209 | May 25, 2010 | Matthews et al. |
| 7,540,625 | Jun. 2, 2009 | Matthews et al. |
| 6,017,129 | Jan. 25, 2000 | Krietzman |
| 7,997,756 | Aug. 16, 2011 | Rorick |

This application relates to powering electrical circuitry in a flashlight tail cap, while still also being able to power the light in the head of the flashlight, without requiring any additional electrical connections beyond the conductive metal body of the flashlight housing. As LED lights fill more and more applications sometimes additional functionality is required. This additional functionality then, in turn, sometimes requires circuitry in the tail cap of a flashlight. Consider LED flashlights. Traditionally they have had a simple electrical switch on either the side or the tail of the flashlight. Note that the end of the flashlight that emits light is often called the head and the opposite end is called the tail. A tail cap refers to the cap or lid that screws on the tail end of the flashlight. The tailcap is removable to allow batteries to be inserted. Note that some designs have the head of the flashlight unscrew to insert batteries instead of having the tail be removed.

As flashlights have advanced through the years various tailcaps have been used as noted in the prior art cited above. A brief summary of these tailcap switches is that the simplest of them are just open or closed switches. More advanced models introduced mechanical means of selecting different modes of operation including different dimming levels by having complicated mechanical switching paths built into the flashlight. These complicated switching designs required multiple electrical paths to exist between the electrical driver that provides electrical current to the LED and the tail cap switch or the selected setting in the tail cap. Having multiple electrical signals exist between the tail cap and the head is accomplished by several different methods in the prior art cited above including using multiple wires, using a flexible circuit, using a PCB, using a battery holder that provides connections to both sides, etc. to connect the electrical signals between the head and tail of the flashlight. These methods all increase the cost and complexity of assembly.

2. Advantages Over Prior Art

One thing is consistent with all of the prior art cited above: none of it solved the problem of how to have the tail cap provide more advanced levels of control of the flashlight without the burden of adding additional connections between the head and tail of the flashlight. While the methods cited in the prior art are certainly varied, they all take a fundamentally mechanical approach to the problem. The method disclosed in this patent takes a more electrical approach and, oddly enough, results in a much simpler mechanical design. This simpler mechanical design saves cost and increases reliability by reducing connectors. The method disclosed here also allows for more advanced circuits to be in the tail cap since power can now be provided.

Another advantage over the prior art is that when a mechanical switch is used to open and close the circuit that switch must be able to withstand the maximum current load. This raises the cost and typically also the size of the switch, which in turn can limit the minimum size of the light.

SUMMARY

This invention allows a flashlight to have power for the light on one end and power for the control circuit on the tail end with only a single electrical conductor connecting the two ends.

DRAWINGS

Figures

FIG. 1—Schematic that shows one embodiment of a powered tail cap circuit

FIG. 2—Schematic that shows one embodiment for a flashlight driver circuit

FIG. 3—Schematic that shows one embodiment for a flashlight battery contact circuit FIG. 4—Schematic that shows one embodiment for a flashlight LED circuit

DETAILED DESCRIPTION

FIG. 1

FIG. 1 shows one embodiment of a flashlight tail cap circuit that can implement the method described in this patent. The circuit of FIG. 1 is versatile and very easily adapted to a wide variety of operating voltages and current loads. For this embodiment the circuit of FIG. 1 is located in the tail cap of the flashlight.

FIG. 2

FIG. 2 shows one embodiment of a flashlight driver circuit. In this case the driver circuit was adapted to work with the other circuits shown in FIG. 1, FIG. 3, and FIG. 4 to form one complete working flashlight that implements the method described in this patent for having a powered tail cap. For this embodiment the circuit shown in FIG. 2 is located in the head of the flashlight.

FIG. 3

FIG. 3 shows one embodiment of a flashlight battery contact board. This board is designed to work with the other circuits shown in FIG. 1, FIG. 2, and FIG. 4 to implement a complete flashlight that has a powered tail cap as disclosed in this patent. For this embodiment the circuit shown in FIG. 3 is located in the head of the flashlight.

FIG. 4

FIG. 4 shows one embodiment of an LED board that is designed to work with the other circuits in the figures above to form one complete flashlight that has a powered tail cap. For this embodiment the circuit shown in FIG. 4 is located in the head of the flashlight.

OPERATION

FIGS. 1, 2, 3, and 4

This circuit is designed to power the flashlight tail cap and, when desired, to also power the constant current circuit in the head of the flashlight. Note that all of this is accomplished with a single power source, which for this embodiment is a single rechargeable battery with a nominal voltage of 3.7 v. First the operation of the embodiment shown in the figures will be described from the moment that the battery is initially installed. After that the light on and light off cases will be described.

When the flashlight embodiment shown in FIGS. 1-4 is first powered up microcontroller 100 will be off. Pull down resistor 106 is at the gate of N-channel MOSFET 110, so MOSFET 110 will be effectively an open circuit. This means that initially the only path for electrical current is through bypass resistor 200, through the body of the flashlight which is indicated as Vchasis in the figures, through diode 104, and finally charging capacitor 102. Once the voltage on capacitor 102 has charged high enough to allow microcontroller 100 to operate, then the flashlight is ready to operate. For this embodiment the flashlight starts in the light off state. In the light off state the tail cap circuit of FIG. 1 is powered but the circuits shown in FIGS. 2-4 will be off, since when MOSFET 110 is not shorted to ground then capacitor 102 will rapidly charge to approximately the same voltage as the battery voltage. I say approximately because some voltage will be dropped across the diodes. Note that in the light off state microcontroller 100 will draw very little current since it can be put in a low power mode, thus not draining much electrical current from the battery. Since capacitor 102 will be approximately the full battery voltage then there is effectively no voltage left for the circuitry in the head of the flashlight. A very small voltage will be dropped across resistor 200, however since microcontroller 100 draws so little current the voltage drop across resistor 200 is negligible and certainly is not enough to power the LED constant current circuit. Also note that microcontroller 100 is configured to have an internal pull up resistor so that if button 112 is pressed microcontroller 100 will be able to detect the pin going low.

Microcontroller 100 would typically stay in the low power mode until an action happens. For this embodiment the action would be button 112 being pressed. When button 112 is pressed and the flashlight is in the light off state then microcontroller 100 would wake up from the low power mode and operate the light. Operating the light is accomplished by having microcontroller 100 apply a PWM signal to the gate of MOSFET 110. When the PWM signal is on the high portion of the duty cycle then MOSFET 110 will become a very low resistance path to ground. When MOSFET 110 is acting as a low resistance path to ground then microcontroller 100 can remain powered by capacitor 102. This allows the circuitry in the head of the flashlight, shown in FIGS. 2-4, to have the full voltage of the battery despite the tail cap circuit shown in FIG. 1 being powered. Since capacitor 102 will start discharging while MOSFET 110 is on care must be taken to not have the period be too long nor to have the duty cycle go too close to 100% on. Given that the human eye will detect frequencies that are 100 Hz or above as being a continuous light, as opposed to a rapidly blinking light, the embodiment used a minimum frequency of 100 Hz. For the circuit values shown in FIGS. 1-4 the maximum duty cycle can be as high as 95% while still retaining reasonable design margins for how much capacitor 102 will discharge. Since microcontroller 100 can turn MOSFET 110 on and off very quickly, all of these requirements are easily met.

To control how bright the light is, the duty cycle of the PWN signal applied by microcontroller 100 to the gate of MOSFET 110 can vary the on time or high portion of the PWM signal. This is a standard technique well understood by those skilled in the art. The duty cycle can vary from 0-95% for the embodiment shown in FIGS. 1-4. A higher duty cycle could be achieved by lowering the value of resistor 200. The lower the value of resistor 200 the faster capacitor 102 will charge. The faster capacitor 102 charges the greater the time that MOSFET 110 can be on, thus raising the maximum duty cycle.

In addition to having the flashlight's LEDs be on in a constant method as described previously dimming and patterns can also be implemented. The beauty of this circuit is that it can implement dimming from 0 to 95% and any of the patterns commonly requested by the market such as strobe or SOS modes.

Alternate Embodiments

There are several alternate embodiments that are readily apparent. For example, although the embodiment used as an example used a single battery for a power source, the circuit would with little modification work with multiple batteries in series. Other alternate embodiments are using a BJT transistor or a MOSFET for the switch. Instead of using diodes for the reverse polarity protection other circuit elements could be used instead. Although the example embodiment used a total of 4 PCB boards, this number could be readily changed.

Since the tail cap already has power, a wide array of user interface options can now be put inside it including buttons, sensors, capacitive sensors, accelerometers, gyros, etc.

The example embodiment showed the circuit that always had power as being on the high side however it doesn't have to always be that way. Any battery operated device that needs multiple circuits powered, with one or more on the "high side" and one or more on the "low side" could make use of this technique.

Finally, a somewhat different approach would be to replace capacitor 102 with a small battery. Since very small batteries exist and since the current draw is low it would be possible to use a battery instead of a capacitor.

Advantages

From the detailed description above a number of advantages over the prior art become evident.

(a) This method allows circuits at the tail cap of a flashlight, where the user interface may reside, to remain powered without requiring any wires between the circuits at the head of the flashlight and the tail cap of the flashlight. Further, both circuits will have full battery voltage so a single power supply can be time shared by both circuits. Not requiring wires between the two circuits lowers cost greatly and also allows for a simpler mechanical solution. The simpler mechanical solution in turn allows for a wider array of form factors for the light since mechanical constraints that the wires impose are removed.

(b) By allowing the tail cap to remain powered simple buttons can be used instead of the latching buttons that are currently used. A latching button requires 2 clicks per mode change, which is more complicated and takes longer. Also, a latching button must be rated to handle the full current of the overall lighting circuit. The simple push button shown in FIG. 1 is much lower cost and smaller because it does not have to handle the full current.

(c) Since the button is not being used to open and close power to the tail cap circuit, it can have a wider range of functions. For example, the present embodiment is able to operate either as a momentary on tactical flashlight or a standard multi-mode flashlight. In the prior art flashlights were not able to operate as both without additional electrical conductors as noted previously. With the present embodiment it can operate as both with no additional cost. This represents a clear advantage over the prior art.

Although the descriptions above contain many specificities, these should not be construed as limiting the scope of the embodiments but as merely providing illustrations of some of several embodiments. For example, I used a LED flashlight as an example but the same benefits and advantages of this method would apply to other LED lights such as LED headlamps, LED bike lights, etc. Thus the scope of the embodiments should be determined by the appended claims and their legal equivalents rather than by the examples given.

I claim:

1. A method of powering a first and second circuit in a portable light using a transistor to alternately power said first circuit and said second circuit, the method comprising:
    connecting said first circuit and said second circuit in series with a single conductive body;
    storing charge in a capacitor in said second circuit; and
    bypassing said second circuit using said transistor so that full power is delivered only to said first circuit while said second circuit continues to operate off the stored energy in said capacitor.

2. The method of claim 1 wherein more than one circuit that can be bypassed using a transistor exists.

3. The method of claim 1 wherein the time said second circuit is bypassed is arranged such that said second circuit is able to maintain a minimum voltage through said time said second circuit is bypassed.

4. The method of claim 1 wherein one of said circuits is a module with a lighting circuit.

5. The method of claim 1 wherein one of said circuits is located on the non-light emitting side of a flashlight.

6. The method of claim 1 wherein said transistor is a MOSFET.

7. The method of claim 1 wherein said capacitor for said second circuit is replaced by another means for storing said charge.

8. The method of claim 1 wherein one or more batteries are used to power said circuits.

9. The method of claim 1 wherein one of said circuits includes a button that can be configured to operate either so that pressing said button changes the light mode or so that the light will only be on when said button is pressed.

10. The method of claim 9 wherein said circuit having said button is configured such that pressing said button changes the light mode and, if said button is held down longer than a certain threshold, then it will change configuration such that then the light will only be on when the button is pressed.

11. A method of powering a first and second circuit in a flashlight using a transistor to alternately power said first circuit and said second circuit, the method comprising:
    connecting said first circuit and said second circuit with the conductive body of said flashlight;
    storing charge in a capacitor in said second circuit; and
    bypassing said second circuit using said transistor so that full power is delivered only to said first circuit while said second circuit continues to operate off the stored energy in said capacitor.

12. The method of claim 11 wherein the time said second circuit is bypassed is arranged such that said capacitor of claim 11 is able to maintain a minimum voltage throughout said bypassed time.

13. The method of claim 11 wherein said transistor is a MOSFET.

14. The method of claim 11 wherein said flashlight is powered by one or more batteries.

15. The method of claim 11 wherein said flashlight is powered by two or more batteries in series.

16. The method of claim 11 wherein one of said circuits includes a user interface circuit wherein said user interface circuit includes a button that can be configured to operate either so that pressing said button changes the light mode or so that said light output will only be on when said button is pressed.

17. The method of claim 16 wherein said user interface circuit is configured such that pressing said button changes the light mode and, if said button is held down longer than a certain threshold, then said user interface will change configuration such that light output will only be on when said button is held down.

18. The method of time sharing power in a portable light between a first circuit and a second circuit, the method comprising:
    connecting said first circuit and said second circuit in series; and
    alternating between bypassing said second circuit and not bypassing said second circuit;
    wherein said second circuit stores charge and operates off said stored charge when bypassed.

19. The method of claim 18 wherein a capacitor is used to store charge and maintain power when said second circuit is being bypassed.

20. The method of claim 18 wherein the time said second circuit is bypassed is arranged such that said stored charge is able to maintain a minimum voltage throughout both the bypassed and non-bypassed portions of said time sharing.

21. The method of claim 18 wherein said bypassing is accomplished with a transistor.

22. The method of claim 18 wherein said circuits are powered by a single battery.

23. The method of claim 18 wherein power is provided by two or more batteries in series.

24. The method of claim 18 wherein one circuit includes a button that can be configured to operate either so that pressing said button can change either the light mode, which may include changing light intensity, or so that the light will only be on when said button is pressed.

25. The method of claim 18 wherein one of said circuits includes a button and is configured such that pressing said button changes the light mode, and if said button is held down longer than a certain threshold, then it will change configuration such that then said portable light will only be on when said button is pressed.

* * * * *